July 18, 1933.　　　　A. J. WAGNER　　　　1,918,357
LAWN MOWER ATTACHMENT
Filed Sept. 27, 1932　　　3 Sheets-Sheet 1

Inventor
A. J. Wagner

By Clarence A. O'Brien
Attorney

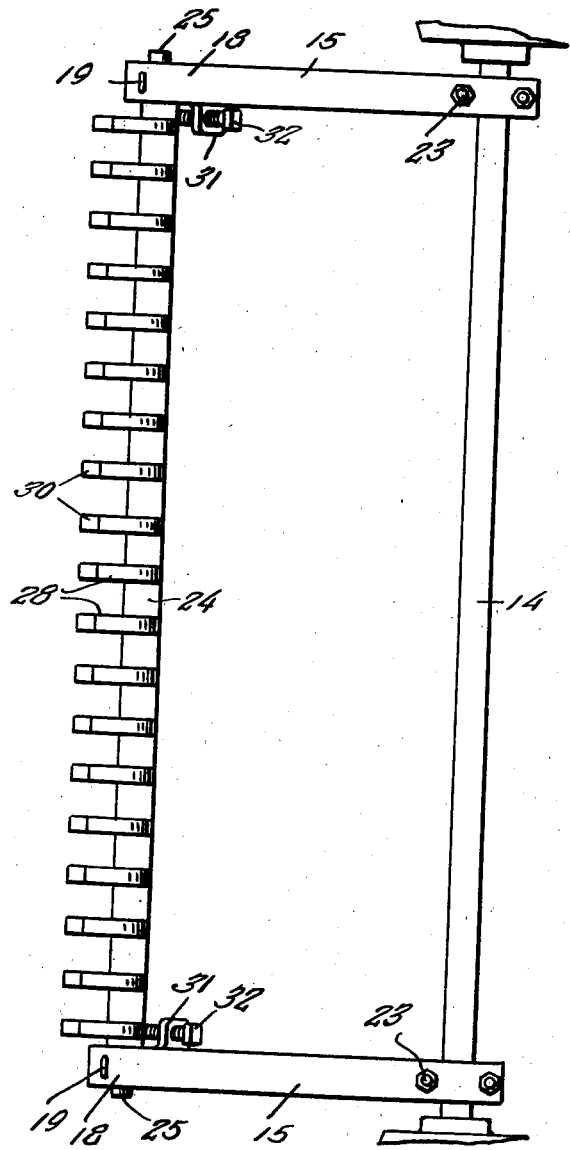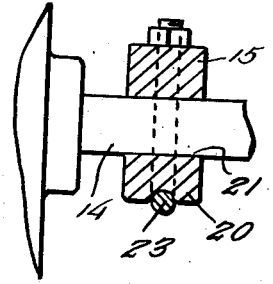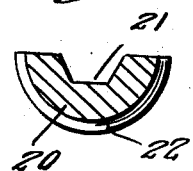

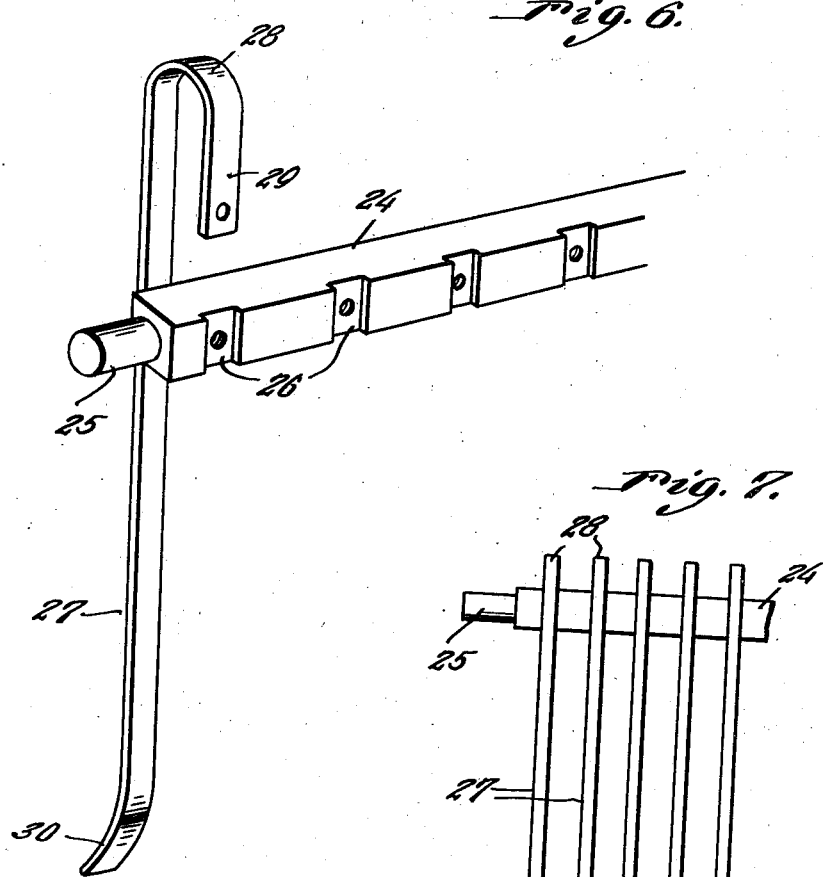

Patented July 18, 1933

1,918,357

UNITED STATES PATENT OFFICE

AUGUST JOSEPH WAGNER, OF GRENLOCH, NEW JERSEY

LAWN MOWER ATTACHMENT

Application filed September 27, 1932. Serial No. 635,077.

This invention relates to an improved attachment for a conventional domestic type lawn mower wherein the attachment is in the form of a weed and grass lifting rake.

It is a matter of common knowledge that blades of cultivated grass grow reasonably straight assuming a substantially perpendicular position. In the average lawn, however, a considerable area of patch portions are made up of crawling weeds and so-called quack and crab grass. The latter varieties of grass lie more or less in flat contact with the earth and hinder the growth of properly reared grass. The undesirable effectiveness of such weeds is enhanced by the failure of the ordinary lawn mower to cut them.

The purpose of the present invention is to provide a weed lifting rake which is applicable to the frontal portion of the frame of the lawn mower for the purpose of lifting the weeds sufficiently to permit them to be cut by the blades of the rotary cutter.

I am aware of the fact that attachments of this general type are not broadly new in the prior art. Therefore, my primary aim is to generally improve upon known patented structures by providing an arrangement which is characterized by simplicity and greater efficiency in operation and use.

Other features and advantages of the invention will become more readily apparent from the following description and drawings.

In the drawings:

Figure 2 is a top plan view of the attachment per se.

Figure 4 is a detail section of the clamping means for said arms.

Figure 5 is a detail sectional view of one of the parts of said clamping means.

Figure 6 is a fragmentary perspective view of certain of the details.

Figure 7 is a front elevation of one end portion of the attachment.

Figure 8 is a fragmentary perspective view of the end portion of one of said attaching and maintenance arms.

Figure 1:
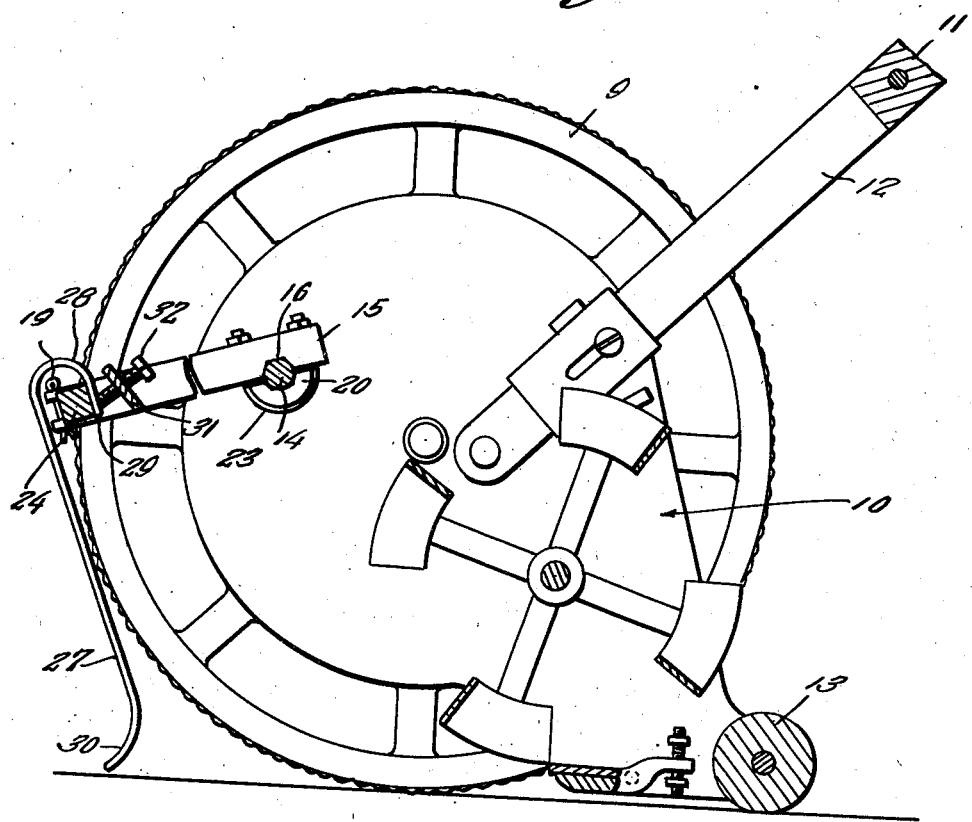
Figure 1 is a view in section and elevation showing an ordinary or conventional lawn mower equipped with the improved attachment.

Referring first to Figure 1 it will be observed that the wheels of the frame-like carriage are denoted by the numeral 9 and the rotary-bladed cutter designated by the numeral 10. The handle or shaft is represented at 11 and secured in place by the yoke 12. The follower roller is denoted by the numeral 13 while the numeral 14 designates the usual brace rod forming a part of the frame. It is to this rod that the attachment is adjustably connected.

Figure 3:
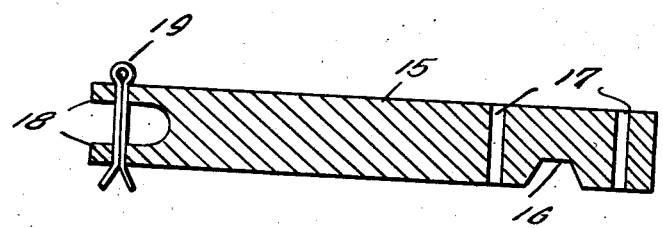
Figure 3 is a longitudinal sectional view of one of the attaching and maintenance arms.

The attachment comprises a pair of duplicate attachment and maintenance arms 15. Each arm, as shown in Figure 3, is formed at its inner end with a retaining notch forming a seat 16 adjacent to which bolt holes 17 are formed. The outer end of the arm is bifurcated and the furcations are distinguished by the numerals 18, said furcations defining a bearing. The furcations are apertured to accommodate a removable cotter key 19. Co-operable with the notched end of the arm is a segmental block 20 having a corresponding type of notch or seat 21 and further provided with a retention groove 22 for the complemental portion of the U-shaped clamping bolt 23. The features 20, 21, 22, and 23, co-operating with the notched end 16 of the arm 15 provided a clamp which is adjustably secured to the cross rod 14 permitting the angularity of the arms 15 to be adjusted with respect to the ground.

The rake proper comprises a horizontally disposed bar 24, preferably square in cross section which is disposed in spaced parallelism to the cross rod 14. At its opposite ends this bar is provided with cylindrical extensions forming trunnions 25 mounted for oscillation in the bearing seats provided through the agency of the complemental furcations 18. The numerals 26 designate longitudinally spaced notches defining keeper seats, the teeth or fingers, which are of flexible or bendable steel are designated by the numerals 27 and the upper end portion thereof is bent as indicated at 28 with a depending terminal 29 forming an attaching tang or shank which is bolted or otherwise secured in the adjacent keeper notch 26. The lower free ends are directed forwardly and outwardly as indicated at 30 to serve as lifting terminals as well as drag shoes. In other words, in the forward or regular movement of the lawn mower, the lifting terminals 30 serve to raise the reclining blades of grass while when the mower is moved in a reverse direction, said terminals 30 serve as drag shoes.

It will be observed that each arm 15 is formed with an apertured substantially oblique ear 31 to accommodate an adjusting and retaining set screw 32. These set screws co-operate in defining stops, whereby to permit the rake as a unit to be rocked to the requisite inclination and thereafter maintained in a substantially set position during the forward motion of the lawn mower, but allowing the rake to tilt forwardly and outwardly when the mower is dragged in a retrograde or rearward direction. Incidentally, the members 30 which then function as drag shoes also facilitate removal of clinging weeds from the rake teeth, thereby making the rake substantially self-cleaning.

The gist of the invention is in the provision of a pair of duplicate arms 15 having adjustable clamping means at their inner ends applicable to the existing or standard cross bar 14 allowing said arms to be adjusted to the requisite position. Secondly, the removable rockable mounting of the rake, as a unit, in the outer bifurcated ends of said arms is a further feature. The flexibility and shape of the rake teeth or fingers is an additional point of distinction. Then, too, the set screws 32 cooperating with the ears 31 and adjacent portion of the rake to function as adjustable stops is a further feature of construction. Consequently, all of these especially selected and coordinated parts afford their proportionate share in accomplishing the desired unitary result of the improved attachment as a whole.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice, if desired.

What is claimed is:

1. An attachment for lawn mowers comprising a rake and attaching means, said rake including a horizontal bar member provided on one face with longitudinally spaced keeper notches having its opposite ends formed with cylindrical trunnions, a plurality of flexible teeth having their upper ends bent to define depending tangs detachably secured in said notches.

2. An attachment for lawn mowers comprising a rake and attaching means, said rake including a horizontal bar member provided on its inner face with longitudinally spaced keeper notches having its opposite end formed with cylindrical trunnions, a plurality of flexible teeth having their upper ends bent to define depending tangs detachably secured in said notches, the lower end portions of said teeth being bent forwardly and outwardly for the purposes described.

3. An attachment for lawn mowers comprising a rake and attaching means, said rake including a horizontal bar member rectangular in cross section and provided with cylindrical trunnion ends, teeth fixed to the bar member, said attaching means comprising a pair of arms in which the trunnion ends are journalled, oblique ears on the arms extending inwardly therefrom adjacent the bar, and set screws threaded to the ears for engagement with the bar to function as stops to limit the rocking of said bar.

AUGUST JOSEPH WAGNER.